US010664537B2

(12) United States Patent
Mueller et al.

(10) Patent No.: US 10,664,537 B2
(45) Date of Patent: May 26, 2020

(54) USER INTERFACE ELEMENT FOR SURFACING RELATED RESULTS

(71) Applicant: Amazon Technologies, Inc., Seattle, WA (US)

(72) Inventors: Nathan Ross Mueller, Seattle, WA (US); David Robert Cole, Brier, WA (US); Anna Maria Godfrey, Seattle, WA (US); Whitney Gale Spathelf, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 615 days.

(21) Appl. No.: 15/074,343

(22) Filed: Mar. 18, 2016

(65) Prior Publication Data
US 2017/0270209 A1 Sep. 21, 2017

(51) Int. Cl.
G06F 16/9535 (2019.01)
G06F 16/248 (2019.01)
G06F 16/242 (2019.01)
G06Q 30/06 (2012.01)
G06Q 30/02 (2012.01)
G06F 16/958 (2019.01)

(52) U.S. Cl.
CPC ........ G06F 16/9535 (2019.01); G06F 16/248 (2019.01); G06F 16/2425 (2019.01); G06F 16/958 (2019.01); G06Q 30/0253 (2013.01); G06Q 30/0601 (2013.01)

(58) Field of Classification Search
None
See application file for complete search history.

(56) References Cited

U.S. PATENT DOCUMENTS

| 8,688,697 | B1* | 4/2014 | Nayar | G06Q 30/0601 707/731 |
| 2013/0041911 | A1* | 2/2013 | Kim | G06F 17/30023 707/766 |
| 2013/0060662 | A1* | 3/2013 | Carlson | G06Q 30/06 705/26.61 |
| 2017/0242913 | A1* | 8/2017 | Tijssen | G06F 17/30646 |

FOREIGN PATENT DOCUMENTS

WO 0155835 A1 8/2001

OTHER PUBLICATIONS

JavaScript (Mar. 16, 2016; https://en.wikipedia.org/w/index.php?title=JavaScript&oldid=710352600, p. 6-7).
International Search Report and Written Opinion (dated May 22, 2017; PCT/US2017/020095).

* cited by examiner

Primary Examiner — Giuseppi Giuliani
(74) Attorney, Agent, or Firm — Thomas | Horstemeyer, LLP

(57) ABSTRACT

Disclosed are various embodiments for editable search. A computing device displays a term on a network page. The computing device then displays a search result on the network page, wherein the search result is related to the term. Later, the computing device displays an alternative term in response to a selection of the term. The computing device then sends a search query to a remote application executing on a remote computing device in response to a selection of the alternative term, wherein the search query includes the alternative term. The computing device subsequently updates the search result on the network page with a new search result related to the alternative term.

20 Claims, 12 Drawing Sheets

USER INTERFACE ELEMENT FOR SURFACING RELATED RESULTS

BACKGROUND

Network pages often contain options for viewing content or selecting from multiple versions of content. For example, a search page may provide a user with a listing of search results linking to different network pages containing content relevant to a search query. If a user wants to see a related set of search results, the user can enter a new query using slight variation of existing keywords (e.g., substituting one keyword in a search query for a similar keywords). However, a user may have to rely on trial and error to identity alternative keywords that will return the desired set of similar search results. Likewise, a network page displaying a listing for an item may present a user with the option to select from several variations of the item for sale by the particular seller on electronic commerce site. However, a user may be unaware which other variations are available from other sellers through the electronic commerce site. As a result, a user may have to use a trial and error approach to find relevant alternatives from other sellers by submitting a series of searches containing different keywords.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various embodiments for implementing a user interface for surfacing related search results. In many instances, users may wish to refine a search, but are unaware of the set of available keywords that would produce additional, relevant results. For example, if a user is viewing a network page related to an item for sale, the user may wish to find other network pages related to other versions of the item. However, the user may be unaware as to what other versions of the item exist. For example, the user may be unaware of which colors or sizes are available. Further, it is possible that some sizes or colors may be available from one seller or available on one electronic commerce platform, but other sizes or colors may be available from another seller or on available from another electronic commerce platform.

To surface alternative search terms or keywords to the user in an easily discoverable manner, a network page can include a user interface element that surfaces alternative search terms or keywords that would result in a related set of search results. In order to see alternative search results, a user could select an individual search term and be presented with a list of alternative search terms to select. Selecting the alternative search term would provide the user with a list of related search results based on the alternative search term. Likewise, if a user wished to see an alternative version of a product (e.g., a different color, a different size, a different quantity, or similar variation), a user could select a term in the title (e.g., the most prominent text describing the product represented on the network page) of the network page for the product. The user would then be presented with a list of alternative terms to select. Once the user selects an alternative term, the user would be presented with a network page corresponding to the alternative version of the product. In the following discussion, a general description of the system and its components is provided, followed by a discussion of the operation of the same.

Figure 1A:
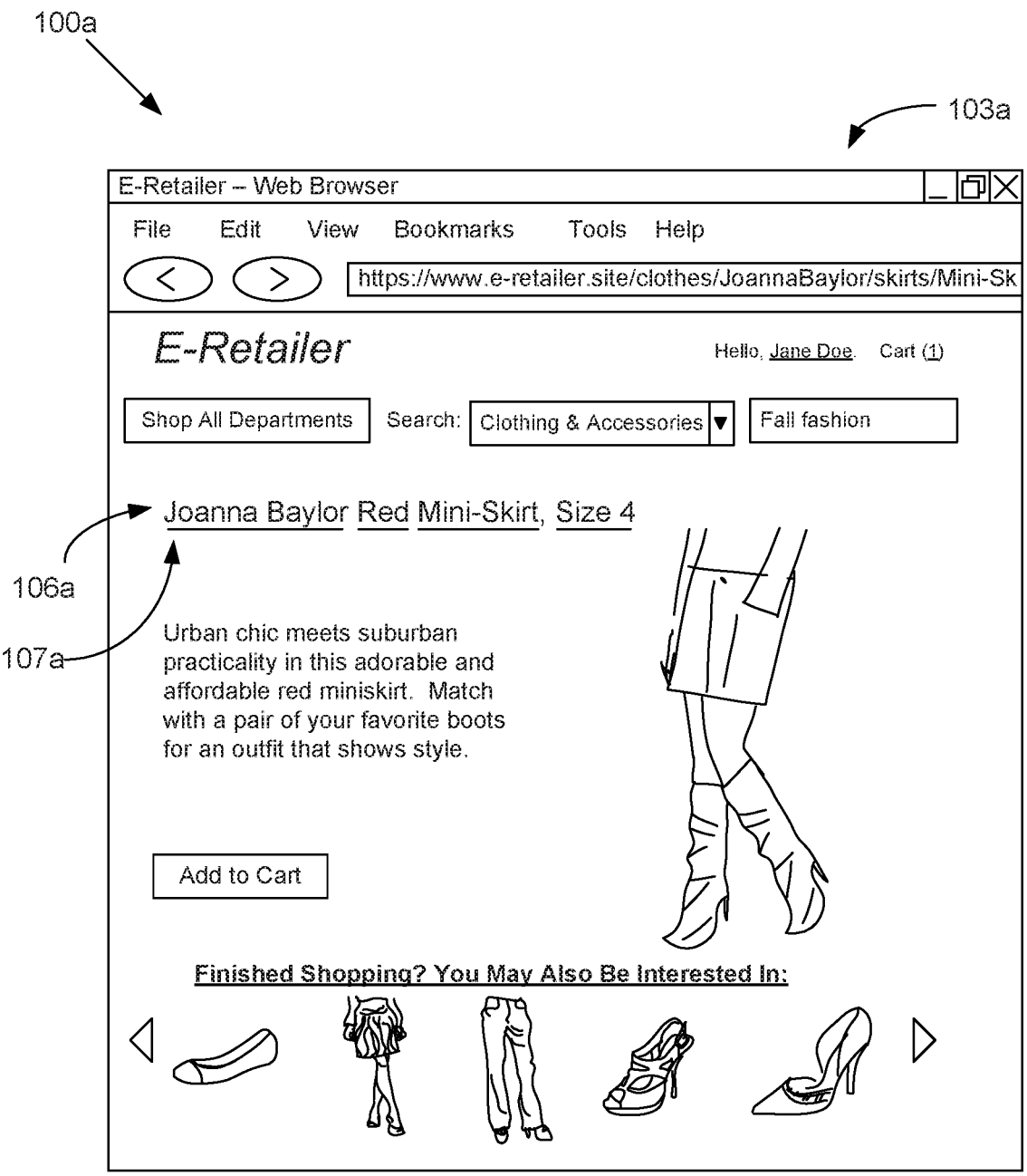
FIG. 1A is a pictorial diagram of an example user interface rendered during the operation of various embodiments of the present disclosure.

With reference to FIG. 1A, shown is a user interface diagram depicting the operation of various embodiments of the present disclosure. The user interface 100a depicts a network page 103a that includes a number of user interface elements. However, similar functionality can be provided through other user interfaces.

The network page 103a depicted provides an example of an electronic commerce storefront. As illustrated, the network page 103a includes a title element 106a, which identifies the item displayed on the network page 103a. The title element 106a can include the name of the item, a description of the item, and other data. For example, the title element 106a depicted includes the name of the item (e.g., "miniskirt") and several descriptive elements (e.g., "Red," "Size 4," and "Joanna Baylor" brand).

The title element 106a could include other types of information for other types of products. For example, the title element 106a of a network page 103a for paper towels could include the brand, the size (e.g., "small," "medium," "large," "extra-large," or variations thereof), the quantity (e.g., single roll, 6 rolls, 12 rolls, 24 rolls, etc.), and other relevant information distinguishing the paper towels displayed on the network page 106a from other paper towels available through the electronic commerce store. Likewise, a title element 106a for a network page 103a for other types of products could include other types of distinguishing information for that particular product category.

In addition, the title element 106a can include one or more function calls to a script for each term in the title element 106a. For example, each term (e.g., a word or phrase) in the title element 106a can include an embedded JAVASCRIPT® function call that triggers execution of a script in response to a user selecting or manipulating the term. Any individual element of the network page 103a could include a function call to the script. However, the function calls are preferentially included in the text of the network page 103a corresponding to the title of the item due to the prominence of the text of the title element 106a relative to other text on the network page 103a and because the text of the title element 106a tends to contain more words or phrases that would serve as useful search terms within the data set of which the item or title element 106a form a part relative to other sections of text in the network page 103a.

The title element 106a can also include one or more visual cues or similar ingress indicators 107a to signal to a user that a word, phrase, or other portion of the title element 106a can be manipulated by the user. For example, each word, phrase, or other portion of the title element 106a that can be manipulated could be underlined, bolded, highlighted, rendered in a particular color, outlined (e.g., with a box) or otherwise emphasized.

Figure 1B:
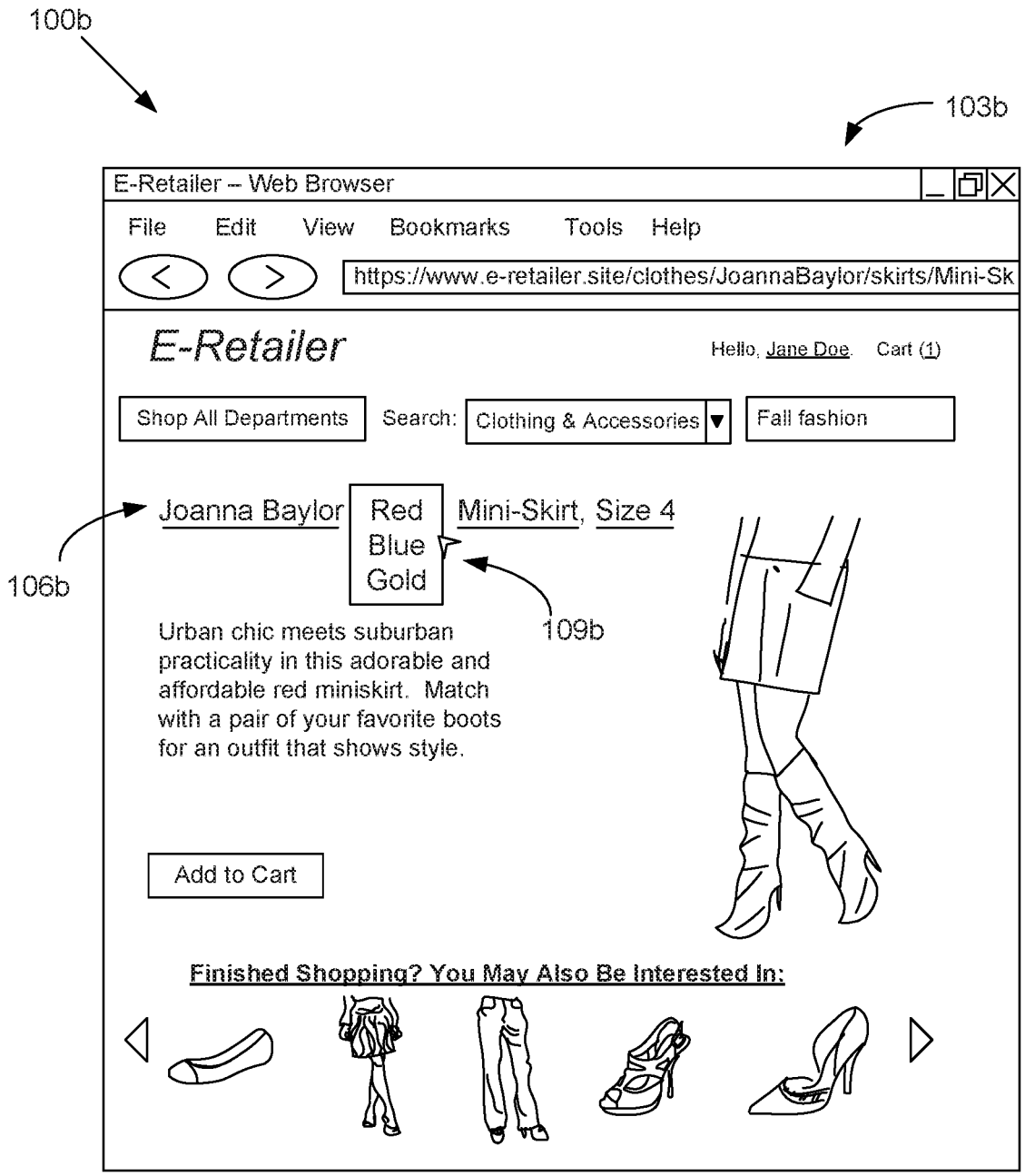
FIG. 1B is a pictorial diagram of an example user interface rendered during the operation of various embodiments of the present disclosure.

FIG. 1B shows a user interface diagram illustrating the further operation of various embodiments of the present disclosure such as those depicted in FIG. 1A. The user interface 100b includes a network page 103b similar to the network page 103a (FIG. 1A). Here, a user has selected one of the terms in the title element 106b with a mouse cursor, causing a list of alternative terms 109b to be displayed. However, the user could select a term in the title element 106b using other approaches (e.g., using his or her finger on a touch screen display). As illustrated, the user is currently viewing a network page 103b for a "Joanna Baylor Red Mini-Skirt, Size 4." Since the user is interested in other colors, the user has selected the term "Red" in the title element 106b to select another color in the list of alternative terms 109b.

However, the user can also select other terms in the title element 106b to see other versions of the item. For example, if the user wished to purchase the mini-skirt in a different size, the user could select the term "Size 4" in the title element 106b. Likewise, if the user wished to see red mini-skirts in size 4 from other brands or manufacturers, the user could have selected the term "Joanna Baylor" in the title element 106b. Similarly, if the user desired to see what other red articles of clothing in size 4 were available from the "Joanna Baylor" brand, the user could select the term "Mini-Skirt" from the title element 106b.

Figure 1C:
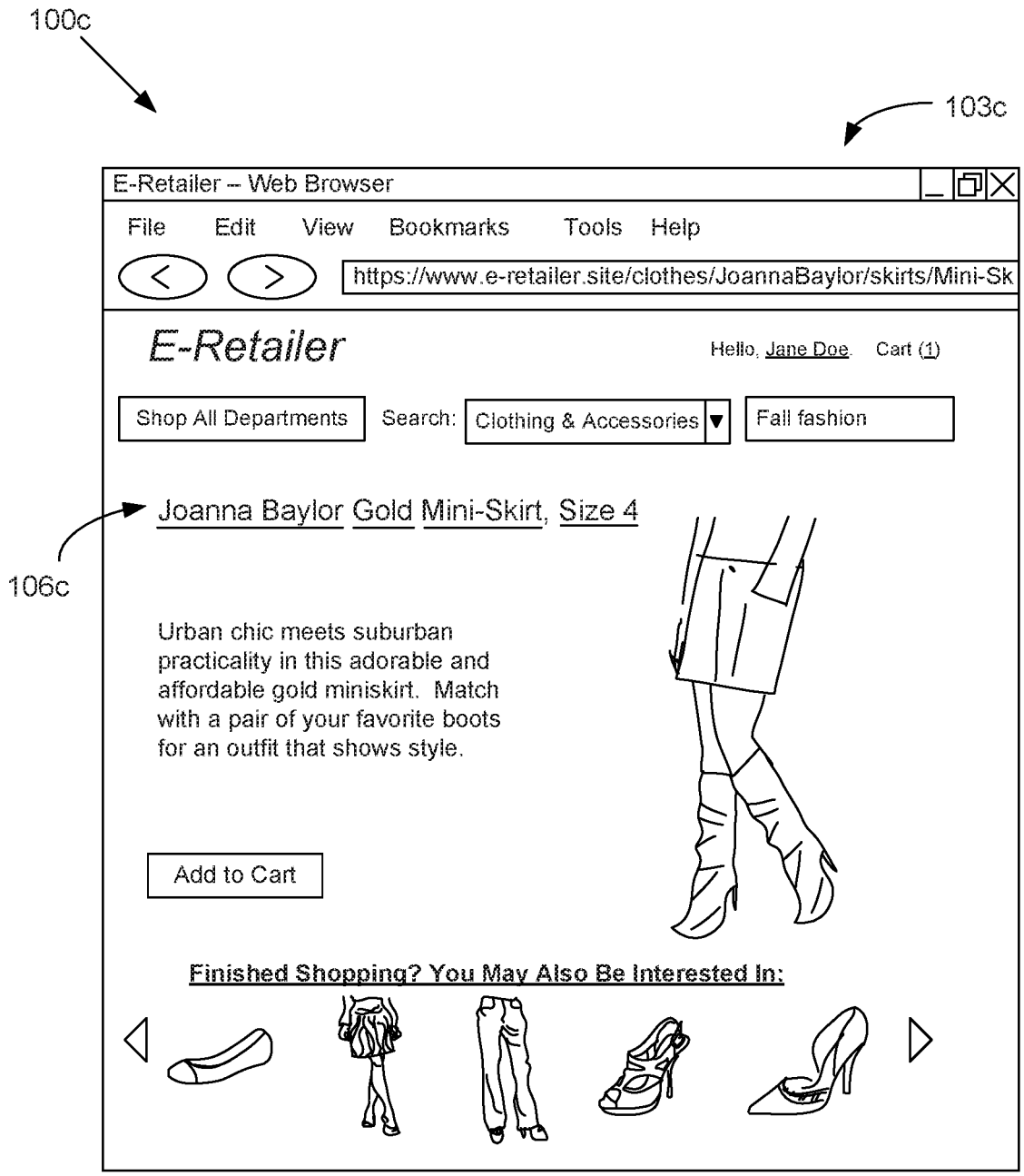
FIG. 1C is a pictorial diagram of an example user interface rendered during the operation of various embodiments of the present disclosure.

FIG. 1C is a user interface diagram depicting one result of the user interactions previously described in FIG. 1B. Here, the user interface 100c includes a network page 100c similar to the network pages 103a (FIG. 1A) and 103b (FIG. 1B). Assuming that the user selected the color "Gold" from the list of alternative terms 109b (FIG. 1B), the network page 103c includes information related to a gold Joanna Baylor mini-skirt in size 4. For example, the title element 106c includes the terms "Joanna Baylor Gold Mini-Skirt, Size 4" and the item description describes a "gold mini-skirt" as a result of the user selecting the term "Gold" from the list of alternative terms 109b.

Figure 1D:
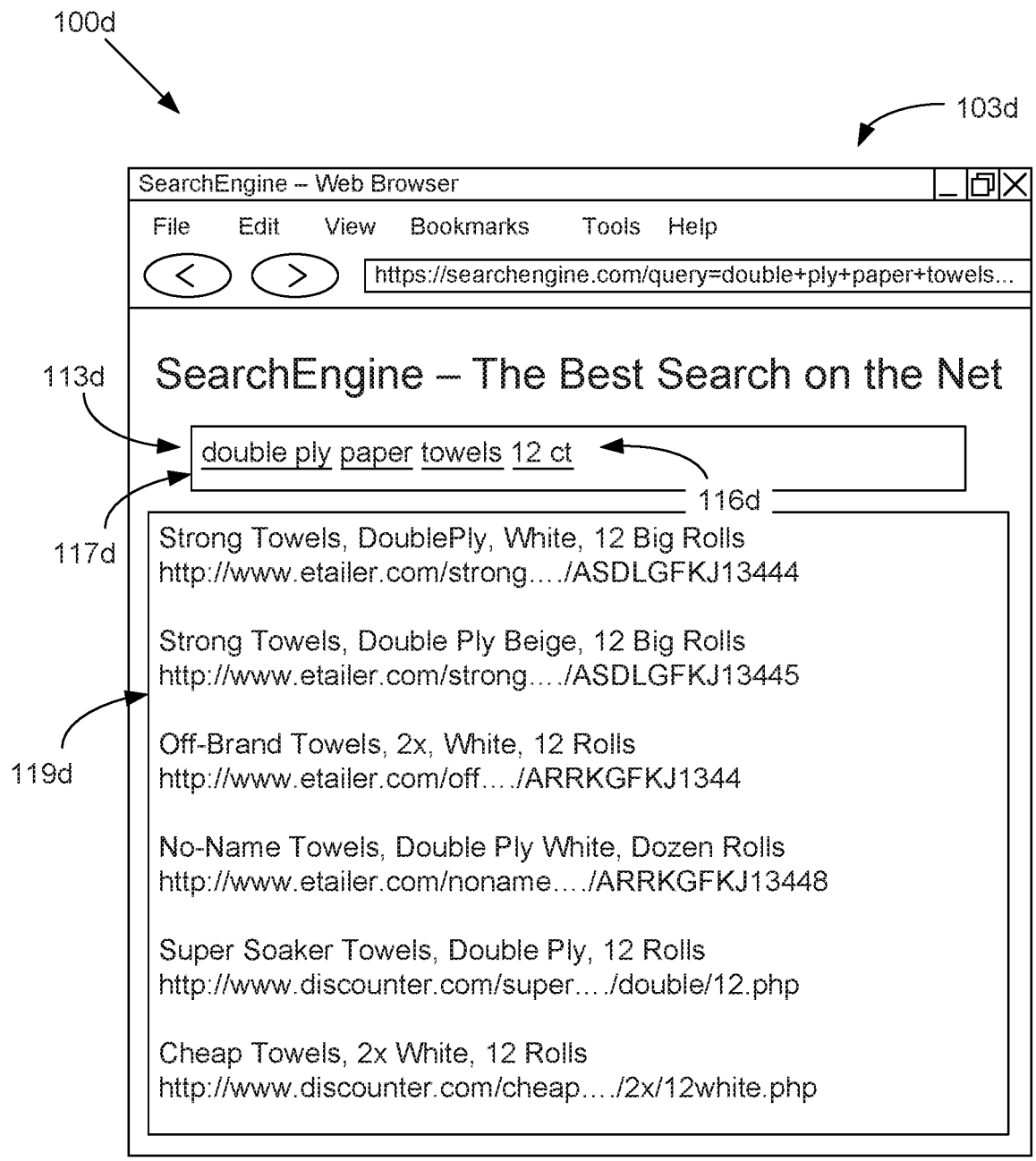
FIG. 1D is a pictorial diagram of an example user interface rendered during the operation of various embodiments of the present disclosure.

In an alternative embodiment, FIG. 1D depicts a user interface diagram illustrating the operation of another embodiment of the present disclosure. The user interface 100d depicts a network page 103d that includes a number of user interface elements. The user interface elements include a search bar 113d containing one or more search terms 116d in addition to a list of search results 119d related to the search terms 116d. Although the search terms 116d depict a product search for paper towels and the search results 119d depict 12-count packages of double ply paper towels of various brands available from various vendors, the principles of the interface depicted can be applied to any set of search terms 116d. One or more search terms 116d or sets of search terms 116d can be marked with one or more visual cues or similar ingress indicators 117d to signal to a user that search term 116d or group of search terms 116d can be manipulated by the user. For example, each of the search terms 116d that can be manipulated could be underlined, bolded, highlighted, rendered in a particular color, outlined (e.g., with a box) or otherwise emphasized.

Figure 1E:
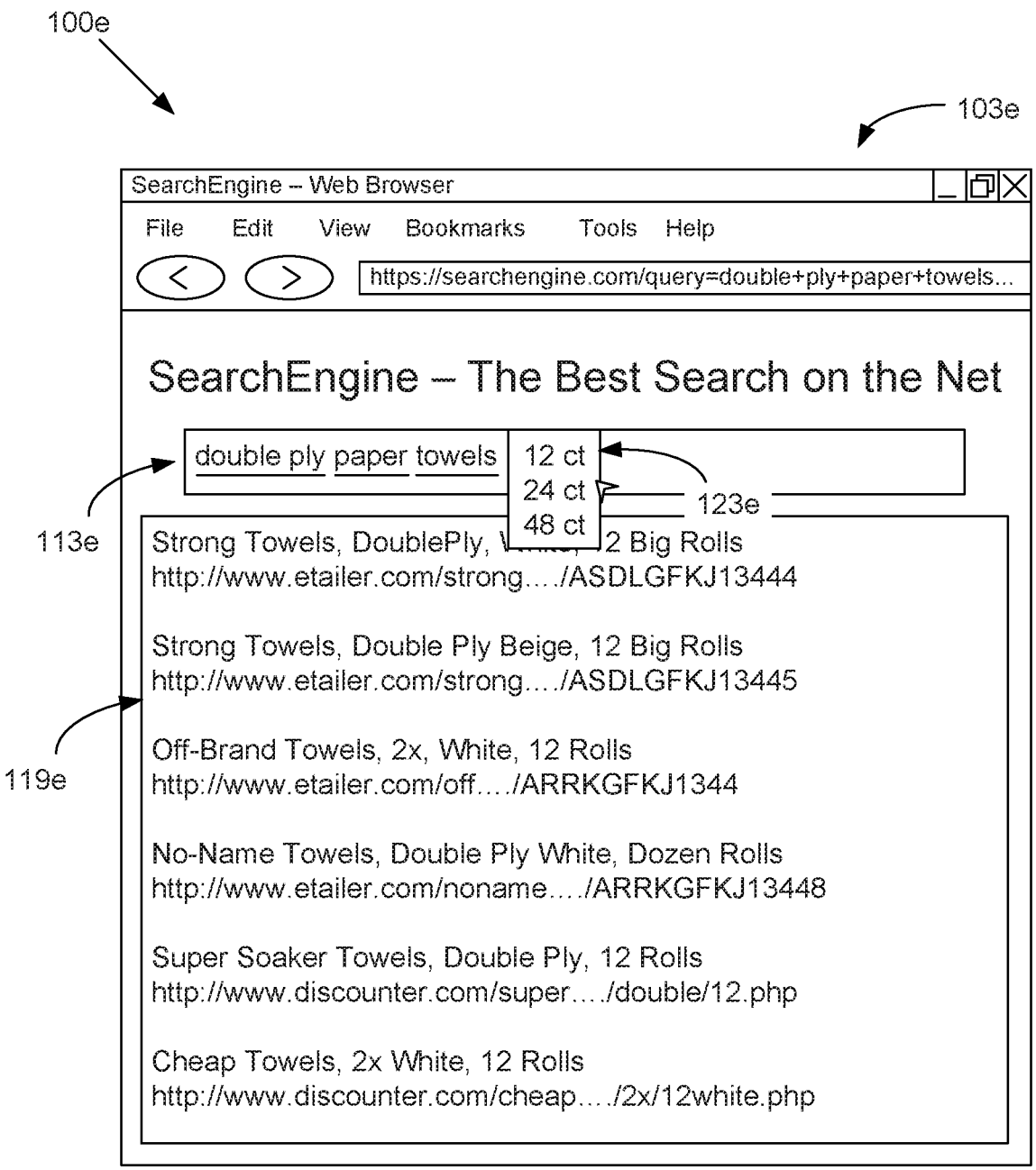
FIG. 1E is a pictorial diagram of an example user interface rendered during the operation of various embodiments of the present disclosure.

FIG. 1E shows a user interface diagram illustrating the further operation of embodiments such as those depicted in FIG. 1D. The user interface 100e includes a network page 103e similar to the network page 103d (FIG. 1D). Here, a user has selected one of the search terms 116d (FIG. 1D) with a mouse cursor, causing a list of alternative search terms 123e to be displayed. However, the user could select a search term 116d in the search bar 113e using other approaches (e.g., using his or her finger on a touch screen display). As illustrated, the user is currently viewing search results 119e for 12 packs of double ply paper towels. Since the user is interested in other lot sizes, the user has selected the search term 116d "12 ct" to select another lot size in the list of alternative search terms 123e.

However, the user can also select other search terms 116d. For example, if the user wished to look for single ply or triple ply paper towels, the user could select the search term 116d "double ply" to cause alternatives to be shown. Likewise, if the user wished to search for other double ply paper goods, the user could select the search term 116d "towels," or "paper towels."

Figure 1F:
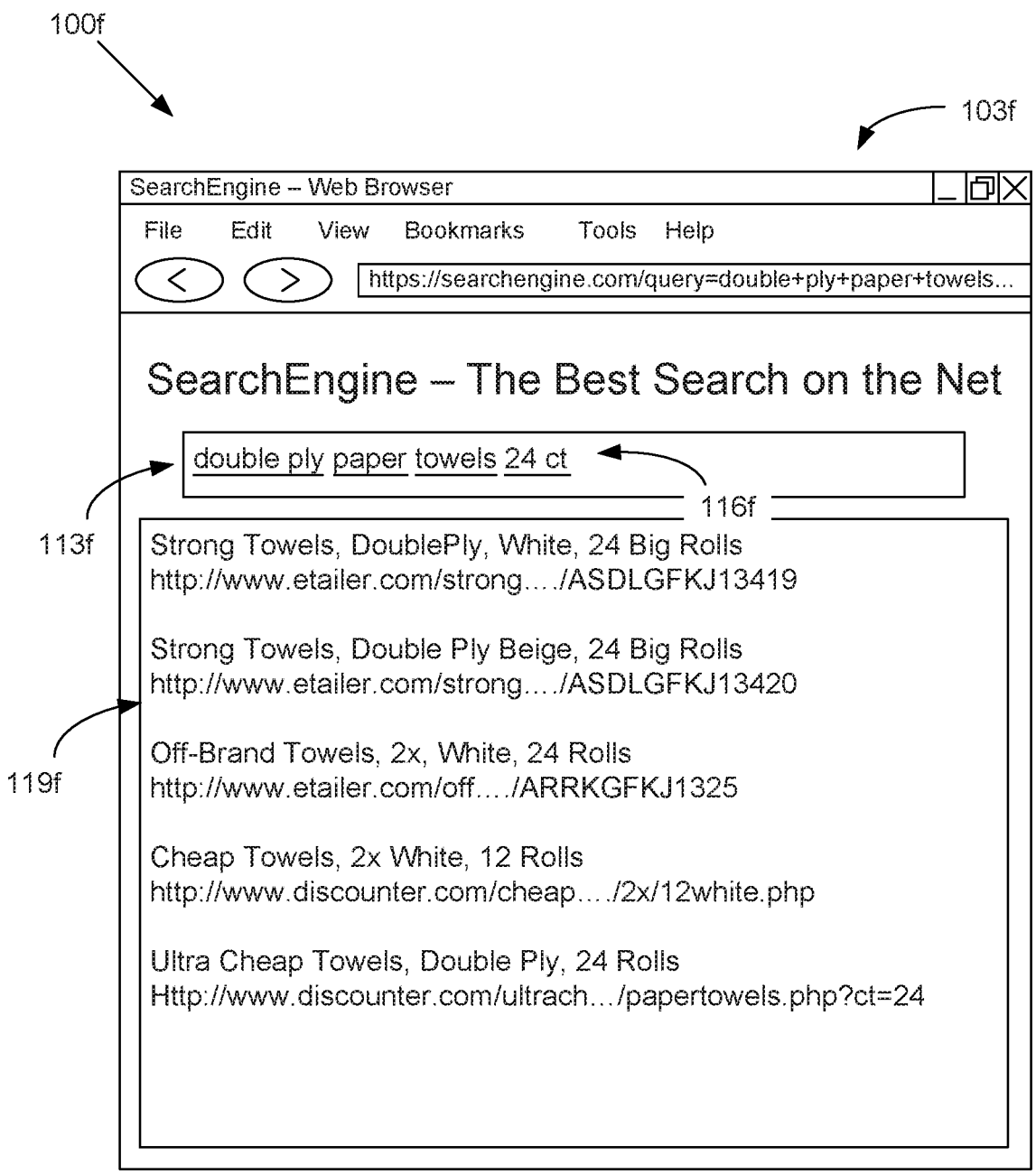
FIG. 1F is a pictorial diagram of an example user interface rendered during the operation of various embodiments of the present disclosure.

Proceeding to FIG. 1F is a user interface diagram depicting one result of the user interactions previously described in FIG. 1E. Here, the user interface 100f includes a network page 100f similar to the network pages 103d (FIG. 1D) and 103e (FIG. 1E). Assuming that the user selected the lot size "24 ct" from the list of alternative search terms 123e (FIG. 1E), the network page 103f includes search results 119f depicting 24-count packages of double ply paper towels of various brands available from various vendors.

Figure 2:
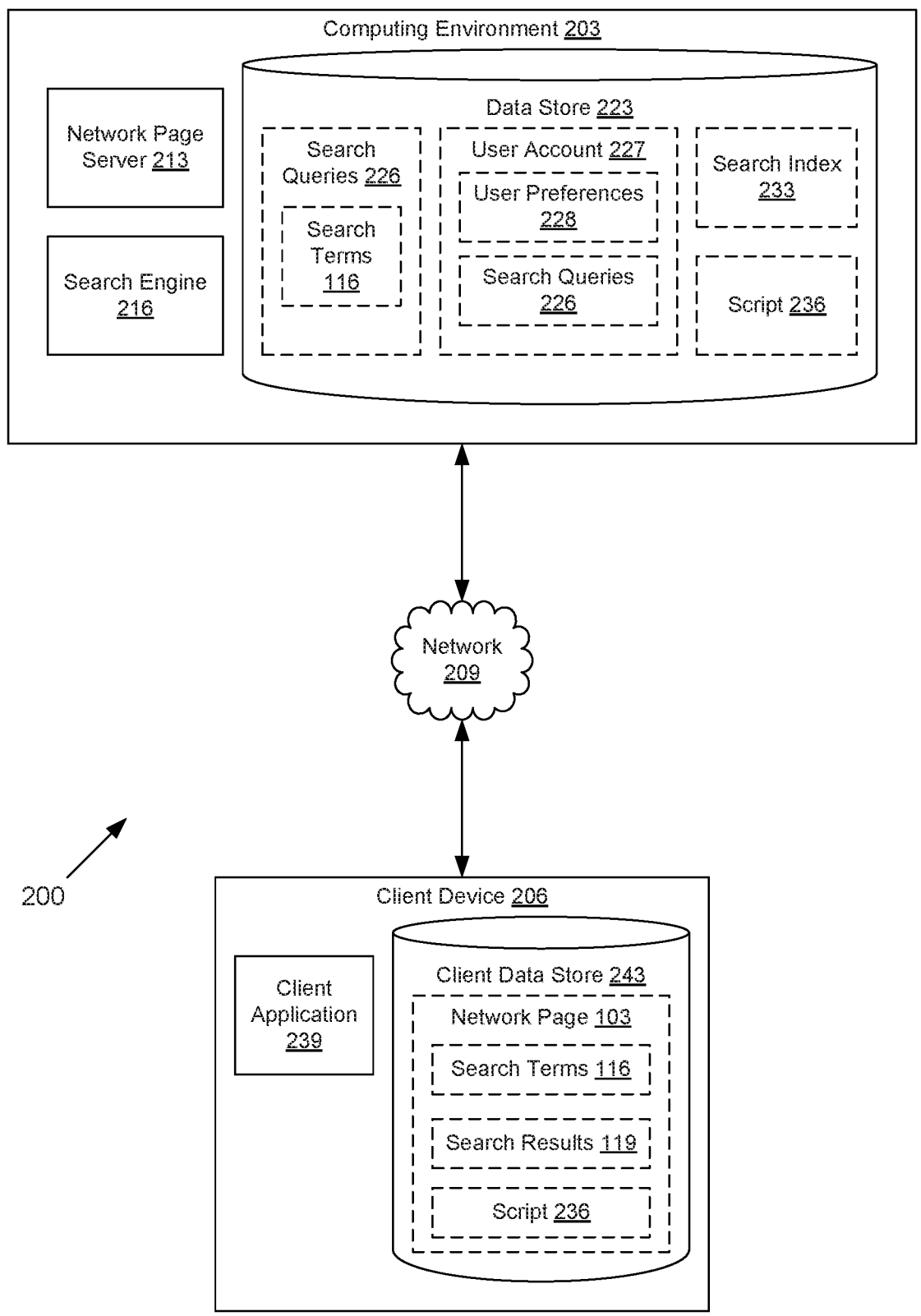
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or any combination of two or more such networks. For example, a network 209 can include satellite networks, cable networks, Ethernet networks, and other types of networks.

The computing environment 203 can include a server computer or any other system providing computing capability. Alternatively, the computing environment 203 may employ a plurality of computing devices that may be arranged, for example, in one or more server banks, computer banks or other arrangements. Such computing devices may be located in a single installation or may be distributed among many different geographical locations. For example, the computing environment 203 may include a plurality of computing devices that together include a hosted computing resource, a grid computing resource, or any other distributed computing arrangement. In some cases, the computing environment 203 may correspond to an elastic computing resource where the allotted capacity of processing, network, storage, or other computing-related resources may vary over time.

Various applications or other functionality may be executed in the computing environment 203 according to various embodiments. The components executed on the computing environment 203, for example, include a network page server 213, a search engine 216, and other applications, services, processes, systems, engines, or functionality not discussed in detail herein. Although the functionality provided by the network page server 213 and the search engine 216 is described as being provided by separate applications, the functionality provided by the network page server 213 and the search engine 216 can, in some instances, be provided by a single application.

The network page server 213 is executed to receive requests from a client device 206 for a network page 103 and to provide the network pages 103 in response. In some instances, the network page server 213 can generate or assemble the network page 103 in response to the request. In other instances, the network page 103 can correspond to preexisting content stored in the data store 223.

The search engine 216 is executed to identify search results 119 corresponding to a search query 226 that includes one or more search terms 116. The search engine 216 can, for example, parse, analyze, or otherwise identify entries in a search index 233 that match or are associated with the search query 226. As an example, the search engine 216 can compare one or more search terms 116 to individual entries in the search index 233 and select entries in the search index 233 based on such factors as the number of keywords 116 appearing in the entry in the search index 233, the relevance of the entry to one or more of the keywords 116, or potentially other factors.

Various data is stored in a data store 223 that is accessible to the computing environment 203. The data store 223 may be representative of a plurality of data stores 223 as can be appreciated. The data stored in the data store 223, for example, is associated with the operation of the various applications or functional entities described below. The data stored in the data store 223 includes, for example, one or more previously submitted search queries 226, one or more user accounts 227, a search index 233, a script 236, or potentially other data.

A search query 226 corresponds to a search request submitted by the client device 206 for one or more entries in the search index 233. For example, a search query 226 could correspond to a search for an item in a product catalog of an electronic commerce application. Likewise, the search query 226 could correspond to a search for one or more network pages 103 or links to network pages 103 that include one or more of the search terms 116 in the search query 226.

A search query 226 can include one or more search terms 116. The search terms 116 can include one or more keywords and can also include one or more operators. A keyword can include a word or phrase representing content that a user wishes to retrieve from the search index 233. An operator can represent the relationship between one or more keywords. For example, if the search terms included the keywords "cherry," "soda," and "12 pack", any entry in the search index 233 related to the keyword "cherry," "soda," or "12 pack" could be returned. However, a user could use the operator "+" (or "AND" or a similar operator) to create a search query of "cherry+soda+12 pack" to limit the search results 119 to those entries in the search index 233 that were related to 12 packs of cherry soda.

A user account 227 can include data related to a user of the client device 106. For example, the user account 227 could include customer data for a user interacting with an electronic commerce site or application. Likewise, the user account 227 could include user data related to a user interacting with a search site or search application. Examples of the data included in the user account 227 include user preferences 228, search queries 226 previously submitted by the user, as well as other data. User preferences 228 can include user specific preferred settings for various features. For example, user preferences 228 could specify the order in which alternative terms 109b (FIG. 1B) or 109e (FIG. 1E) are listed.

The search index 233 represents a searchable listing of entries. Entries in the search index 233 can include text, images, video, audio, links to network pages (e.g., hyperlinks) or potentially other data. The search index 233 can be organized to optimize locating entries associated with one or more search terms 116 in a search query 226. For example, each entry in the search index 233 can be linked to, associated with, or otherwise "tagged" with individual search terms 116. The search engine 216 can then quickly respond to a search query 226 by identifying each entry associated with one or more of the search terms 116 instead of slowly search the corpus of each entry in the search index 233 to determine whether one or more search terms 116 are present. An example of a search index 233 can include a product catalog that includes listings for various items (e.g., image, description, price, and other data). Another example of a search index 233 can include an index of links to various network pages containing content.

The search index 233 can be populated with data in a number of ways. For example, the search index 233 could be populated with data as a vendor makes items available for sale through an electronic commerce application. As a vendor makes inventory available, the vendor can create entries in the search index that include details for each item (e.g., name, make, model, color(s), size(s), price, etc.). As another example, the search index 233 can be populated automatically. For example, data could be added to the search index 233 as crawlers follow links between network sites or network pages 103. Likewise, data could be added by tracking the search queries 226 submitted by users and the individual search results 119 that the users select. A combination of approaches can also be used in some embodiments.

The script 236 corresponds to executable code that can be embedded or included in a network page 103. The script 236 can be configured to execute on the client device 206 to perform various functions. For example, the script 236 can be configured to communicate with the network page server 213 or the search engine 216 in order to update the network page 103 after the network page 103 has been generated and sent to the client device 206 by the network page server 213. For instance, the script 236 can be configured to allow a user to select alternatives to search terms 116 previously submitted to the search engine 216, form a new search query 226 that includes the selected alternative search terms 116, and update the search results 119 displayed on the network page 103. The script 236 can be further configured to perform these functions using various techniques, such as asynchronous JAVASCRIPT® and extensible markup language (XML) (AJAX).

The client device 206 is representative of a plurality of client devices that may be coupled to the network 209. The client device 206 may include, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display. The display may include one or more devices such as liquid crystal display (LCD) displays, gas plasma-based flat panel displays, organic light emitting diode (OLED) displays, electrophoretic ink (E ink) displays, LCD projectors, or other types of display devices.

The client device 206 may be configured to execute various applications such as a client application 239 or other applications. The client application 239 may be executed in a client device 206, for example, to access network content served up by the computing environment 203 or other servers, thereby rendering a user interface on the display. To this end, the client application 239 may include, for example, a browser, a dedicated application, etc., and the user interface 100 may include a network page 103, an application screen, etc. The client device 206 may be configured to execute applications beyond the client application 239 such as, for example, email applications, social networking applications, word processors, spreadsheets, or other applications.

Various types of data can also be stored on the client device 206 in a client data store 243. The client data store 243 may be representative of a plurality of client data store 243 as can be appreciated. The data stored in the client data store 243, for example, is associated with the operation of the client application 239 or other functions performed by the client device 206. The data stored in the client data store 243 includes, for example, a network page 103 provided by the network page server 213 or potentially other data.

The network page 103 corresponds to a document generated by the network page server 213. The network page 103 can include markup language, such as hypertext markup language (HTML) or extensible markup language (XML), that identifies individual elements of the network page 103 and defines their spatial location relative to each other. For example, the network page 103 can include one or more search terms 116 that were submitted by a user to search for network content, one or more search results 119 related to the submitted search terms, and a client executable script 236 to provide interactive or dynamic functionality.

Accordingly, the network page 103 can correspond to a user interface for network content. For example, the network page 103 could correspond to the network page 103a (FIG. 1A), the network page 103b (FIG. 1B), the network page 103c (FIG. 1C), the network page 103d (FIG. 1D), the network page 103e (FIG. 1E), or the network page 103f (FIG. 1F). Likewise, the search terms 116 can include the search terms 116d (FIG. 1D), search terms 116f (FIG. 1F), or individual terms in a title element, such as the title element 106a (FIG. 1A), the title element 106b (FIG. 1B), or the title element 106c (FIG. 1C).

Next, a general description of the operation of the various components of the networked environment 200 is provided. To illustrate the principles of the pending disclosure, the operation of several embodiments will be described. However, the operation of the components can be applied to other embodiments as well.

In a first embodiment, a user employs the client application 239 to navigate to a network page 103 corresponding to an item listed in a product catalog of an electronic commerce store. For example, the user may navigate to a network page 103 similar to network page 103a (FIG. 1A). As previously described, the network page 103a can include a title element 106a (FIG. 1A) that includes one or more terms that describe the item on the network page 103a.

In this example, in order to view other versions (e.g., different color, different size, or similar variant) of the item, the user may select a term. An example of a user selecting the term in the title element 106b (FIG. 1B) is illustrated in FIG. 1B. As the user selects the term in the title element 106b, the script 236 causes the client application 239 to render a user interface element on the display of the client device containing a list of alternative terms 109b. The user interface element could include a dropdown menu rendered as an overlay over the network page 103b. Another user interface element could include a pop-up window overlaid over the network page 103b that contains the list of alternative terms 109b. The user is then able to select a term 116 from the list of alternative terms 109b presented.

In response to the user selecting the term in title element 106b (FIG. 1B), the script 236 included in the network page 103 is executed by the client application 239 to determine which term in the title element 106b was selected. The script 236 then modifies the title element 106b of the network page 103b to display a list of alternative terms, such as the list of alternative search terms 109b (FIG. 1B).

The list of alternative search terms 109b may be retrieved by the script 236 in several ways. In some instances, the list of alternative search terms 109b can be stored in locally in the network page 103 or in the client data store 243. In these instances, the script 236 can reference the stored list of alternative search terms 109b and modify the network page 103b to show the list of alternative search terms 109b. However, in other instances, the script 236 can instead request one or more alternative terms from the network page server 213. For example, the script 236 may send a request for alternative terms to the network page server 213 and include in the request the term that the user selected in the title element 106b of the network page 103b.

In response, the network page server 213 can identify which search terms are valid alternatives to the term provided by the script 236 and send the identified alternative terms to the script 236. For example, if the term provided by the script 236 represented a color of the item, then the network page server 213 could cause the search engine 216 to identify other available colors for the item. The network page server 213 could then send a response to the script 236 that included the alternate colors.

After a user has selected an alternative term, the script 236 then notifies the network page server 213 which alternative term was selected. The network page server 213 then retrieves information related to the new product and provides it to the script 236. For example, if the user was viewing a red item and then selected the color gold from a list of alternative colors, then script 236 would notify the network page server 213 that the color gold had been selected by the user. The network page server 213 would then retrieve the appropriate information for a gold version of the item (e.g., photos of a gold version of the item, updated descriptive text for a gold version of the item, an updated price for the gold version of the item, or potentially other data) from the search index 233 or similar product catalog and provide the information to the script 236. The script 236 could then update the content of the network page 103. However, in some instances, the script 236 could instead request that the network page server 213 generate and provided a new network page 103 corresponding to the alternative version of the item to the client application 239. The script 236 could then cause the client application 239 to render the replace the current network page 103 with a new network page 103.

In a second embodiment, a user employs the client application 239 to navigate to a network page 103 listing one or more search results 119. For example, the user may have navigated to a network page 103*d* similar to network page 103*d* (FIG. 1D) by submitting a search query 226 containing the search terms 116*d* (FIG. 1D) listed in the search bar 113*d* (FIG. 1D). In this example, in order to view other search results, the user may select a search term 116*d* in the search bar 116*d*. An example of a user selecting a search term 116*d* in the search bar 113*d* is illustrated in FIG. 1E.

In response to the user selecting a search term 116 in the search bar 113*e*, the script 236 included in the network page 103 is executed by the client application 239 to determine which term in the search bar 113*e* was selected. The script 236 then modifies the search bar 113*e* of the network page to display a list of alternative terms, such as the list of alternative search terms 123*e* (FIG. 1E).

The list of alternative search terms 123*e* may be retrieved by the script 236 in several ways. In some instances, the list of alternative search terms 123*e* can be stored in locally in the network page 103 or in the client data store 243. In these instances, the script 236 can reference the stored list of alternative search terms 123*e* and modify the network page 103*e* (FIG. 1E) to show the list of alternative search terms 123*e*. However, in other instances, the script 236 can instead request one or more alternative terms from the network page server 213. For example, the script 236 may send a request for alternative terms to the network page server 213 and include in the request the term that the user selected in the search bar 113*e* of the network page 103*e*.

In response, the network page server 213 can identify which search terms are valid alternatives to the term provided by the script 236 and send the identified alternative terms to the script 236. For example, the network page server 213 can request that the search engine 216 provide a list of alternative search terms 123*e* (FIG. 1E). The search engine 216 can then analyze one or more previously submitted search queries 226 that include one or more search terms 116*d* previously submitted. Based on the analysis of the previously submitted search queries 226, the search engine 216 can determine which search terms 116 would correspond to an alternative to the selected search term 116. For example, the search engine 216 could identify previously submitted search queries 226 that differ by a single search term 116 to determine which search terms to include in the list of alternative search terms 123*e*. The search engine 216 then provides the list of alternative search terms 123*e* to the network page server 213, which then forwards the list of alternative search terms 116 to the script 236.

After a user has selected an alternative term, the script 236 then notifies the network page server 213 which alternative term was selected. The network page server 213 then submits a search query 226 to the search engine 216. The search query 226 contains one or more of the previously submitted search terms 116 in addition to the alternative search term 116 selected by the user. The search engine 216 then identifies one or more search results 119 from the search index 233 and provides the search results 119 to the network page server 213. The network page server 213 then provides the search results 119 to the script 236, which modifies the network page 103 to include the new search results 119.

Figure 3:
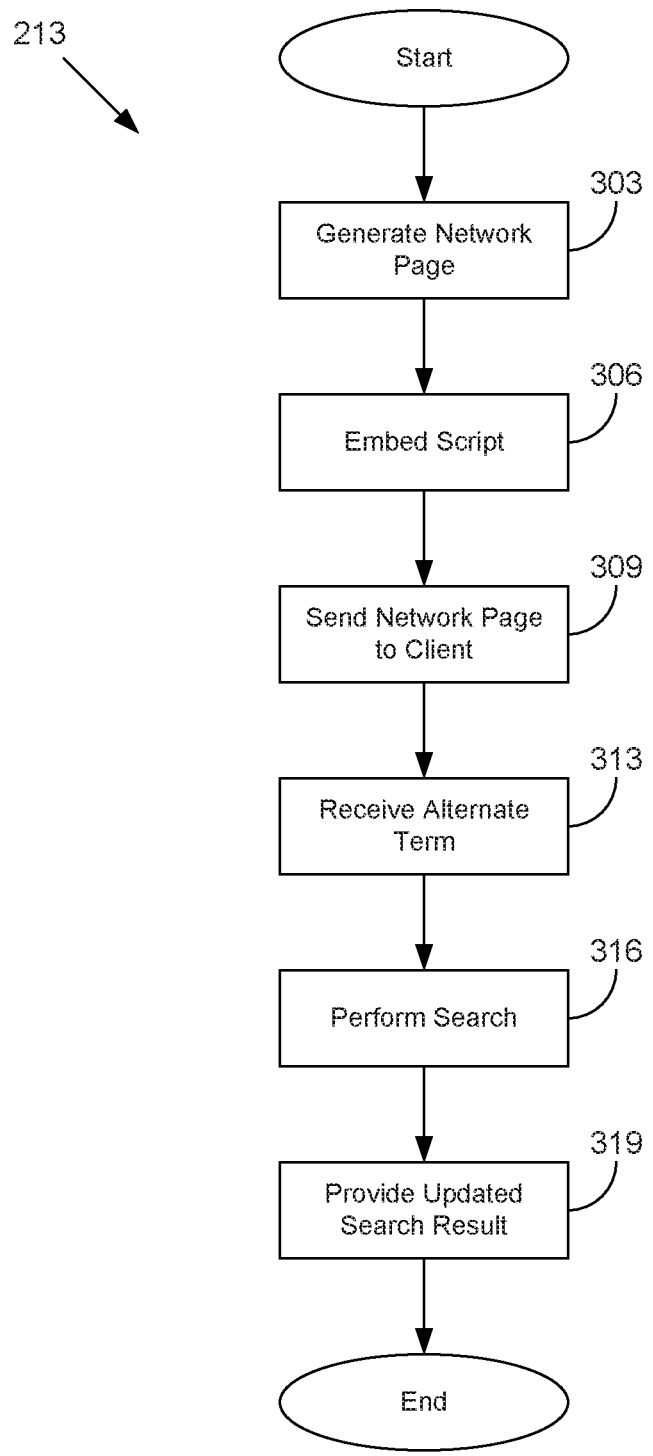
FIG. 3 is a flowchart illustrating one example of functionality implemented as portions of an application executed in the networked environment of FIG. 2 according to various embodiments of the present disclosure.

Referring next to FIG. 3, shown is a flowchart that provides one example of the operation of a portion of the network page server 213 according to various embodiments. It is understood that the flowchart of FIG. 3 provides merely an example of the many different types of functional arrangements that may be employed to implement the operation of the portion of the network page server 213 as described herein. As an alternative, the flowchart of FIG. 3 may be viewed as depicting an example of elements of a method implemented in the computing environment 203 (FIG. 2) according to one or more embodiments.

Beginning with box 303, the network page server 213 generates a network page 103. To generate the network page 103, the network page server 213 retrieves a document identified by a uniform resource locator (URL) submitted by the client application 239. The document may, for example, correspond to a static file or it may include various logical functions instructing the network page server 213 how to generate the network page 103 in a programmatic manner. For example, if the document corresponds to a server-side script, such as an ACTIVE SERVER PAGE (ASP)® script, a PHP: HYPERTEXT PREPROCESSOR (PHP)® script, or similar server script, then the network page server 213 may programmatically generate the network page 103.

Moving on to box 306, the network page server 213 can embed a script 236 into the generated network page 103. In some instances, the script 236 can be embedded as part of the network page generation process described above in box 303. In other instances, the script 236 may embedded in a separate step, such as at box 306. For example, the network page server 213 may edit the HTML of the network page 103 to add the script 236 at predetermined or predefined locations based on the content of the HTML file for the network page 103.

Proceeding next to box 309, the network page server 213 sends the generated network page 103 to the client application 239. For example, the network page server 213 can include the network page 103 in a hypertext transfer protocol (HTTP) response. Alternatively, the network page server 213 can include the network page 103 or portions of the network page 103 in some other type of response.

Referring next to box 313, the network page server 213 then receives an alternative search term 116 from the embedded script 236. In some instances, the script 236 can submit the alternative search term 116 along with one or more other search terms 116, such search terms 116 submitted as part of a prior search query 226. For example, the script 236 can submit the alternative search term 116 along with remaining terms in a previously submitted search query 226 in order to obtain updated search results 119. Likewise, the script 236 can submit the alternative search term 116 along with one or more terms in a product description in order to obtain the appropriate listing from a product catalog. As another example, the script 236 can submit the alternative search term 116 along with the search term 116 being replaced in order to the network page server 213 to replace the search term 116 with the alternative search term 116 in a previously submitted search query 226. In this example, a search using the previously submitted search query 226 would be executed using the new search term 116.

Moving to box 316, the network page server 213 causes a search using the alternative search term 116 to be performed. In some instances, the network page server 213 may submit the alternative search term 116 and one or more other search terms 116, such as one or more search terms 116 of a previously submitted search query 226 to the search engine 213. In other instances, the network page server 213 can use the alternative search term 116 and one or more other search terms 116 (e.g., product description terms) to retrieve a specific page from the search index 233, such as a product or item detail page from a product catalog. Proceeding next to box 319, the network page server 213 provides the results of the search using the search query 226 previously submitted in box 316 to the script 236.

Figure 4:
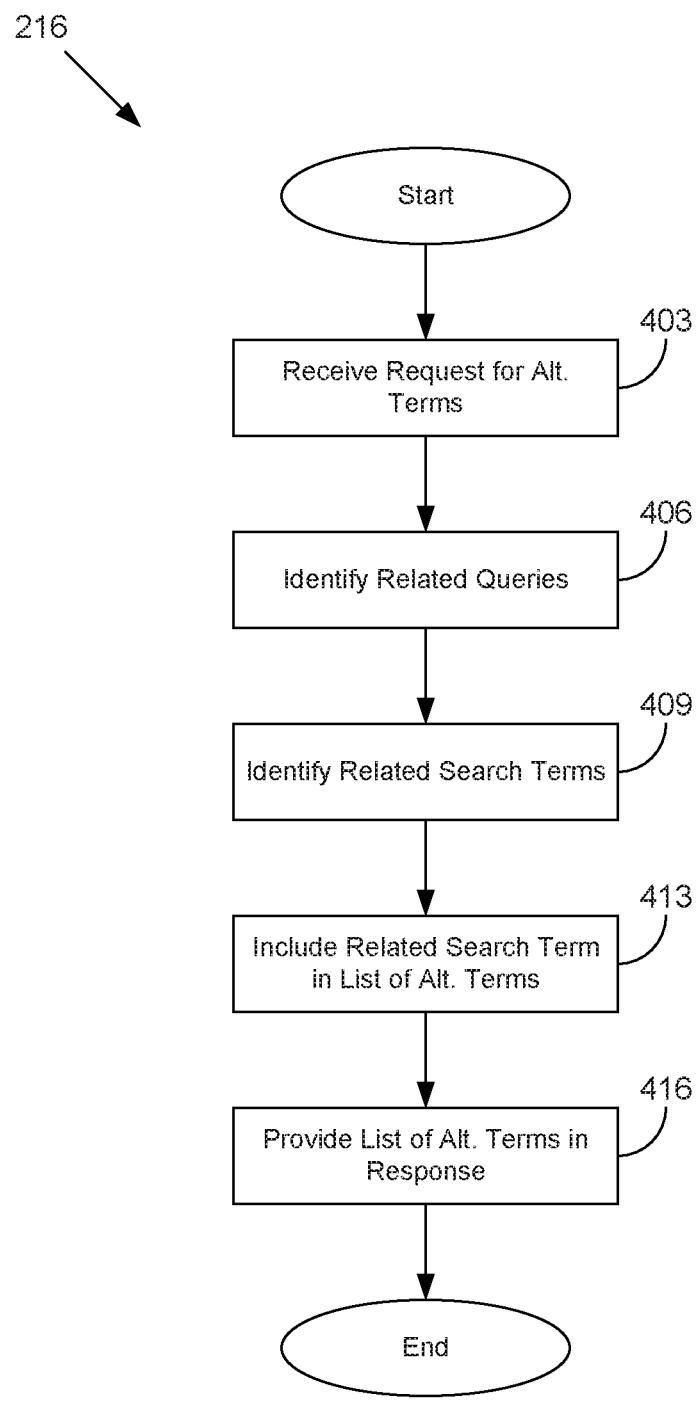
FIG. 4 is a flowchart illustrating one example of functionality implemented as portions of an application executed in the networked environment of FIG. 2 according to various embodiments of the present disclosure.

Referring next to FIG. 4, shown is a flowchart that provides one example of the operation of a portion of the search engine 216 according to various embodiments. It is understood that the flowchart of FIG. 4 provides merely an example of the many different types of functional arrangements that may be employed to implement the operation of the portion of the search engine 216 as described herein. As an alternative, the flowchart of FIG. 4 may be viewed as depicting an example of elements of a method implemented in the computing environment 203 (FIG. 2) according to one or more embodiments.

Beginning with box 403, the search engine 216 receives a request for one or more alternatives to search term 116 included in the request. In some instances, the request may be received from the network page server 213. In other instances, the request may be received from the client application 239. The request for the alternative search term 116 may include one or more other search terms 116 included in a search query 226 originally submitted by the client application 239.

Proceeding to box 406, the search engine 216 identifies one or more related queries. For example, the search engine 216 may identify previously submitted search queries 226 that share one or more search terms 116 with the search query 226 that was originally provided by the client application 239. For instance, the search engine 216 may do a word for word comparison of each search term 116 in a previously submitted query 226 to each search term 116 in the search query 226 originally provided by the client application 239.

Preferentially, the search engine 216 may identify previously submitted search queries 226 that differ by a single search term 116 from the search query 226 originally submitted by the client application 239. This allows the search engine 216 to identify alternative search terms 116 that would produce the most relevant search results 119. However, the search engine 216 can use a more relaxed threshold in some embodiments if necessary, such as when an alternative search term would produce too few search results 119.

Moving to box 409, the search engine 216 identifies related search terms 116 based at least in part on the related search queries 226. In some embodiments, the search engine 216 can identify any search term 116 included in a related search query 226 that was not present in the search query 226 originally submitted by the client application 239 as a potentially alternative search term 116. However, in some embodiments, the search engine 216 may perform additional filtering. For example, if the search term 116 for which an alternative is sought corresponds to a number, non-numeric search terms 116 may be excluded. Likewise, if the search term 116 for which an alternative is sought corresponds to a descriptor, such as an adjective, then non-descriptive search terms 116 (e.g., nouns) may be excluded. As an example, if an alternative for the color "red" is desired, the term "truck" may be excluded as a possible alternative search term 116.

Referring next to box 413, the all of the search terms 116 identified in box 409 are added to a list of alternative search terms. Proceeding next to box 416, the list of alternative search terms is then provided in a response. If the request was originally received from the network page server 213, then the list of alternative search terms is provided in a response sent to the network page server 213. Similarly, if the request was instead received from the client application 239, then the list of alternative search terms is provided in a response sent to the client application 239.

Figure 5:
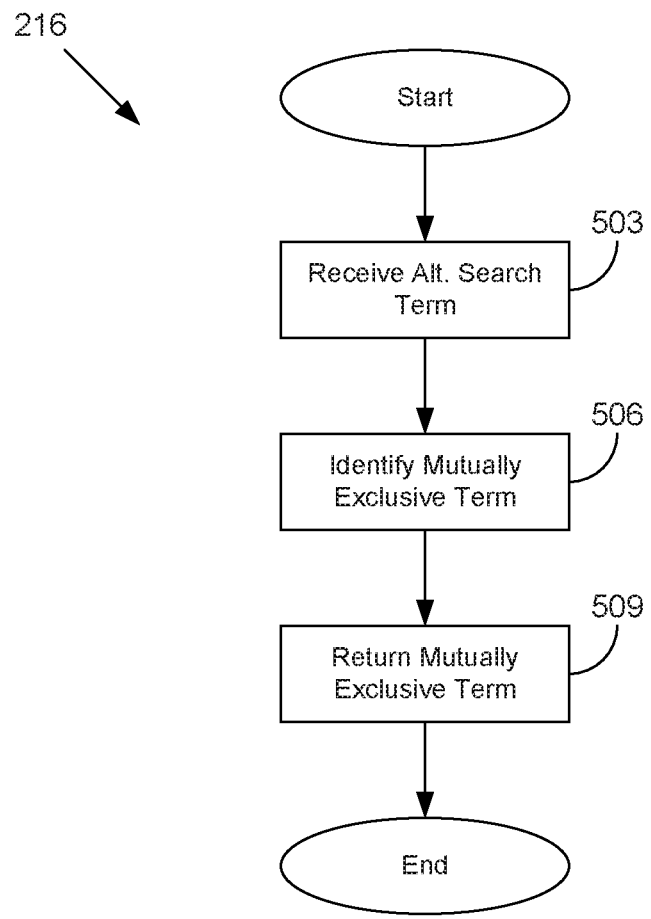
FIG. 5 is a flowchart illustrating one example of functionality implemented as portions of an application executed in the networked environment of FIG. 2 according to various embodiments of the present disclosure.

Referring next to FIG. 5, shown is a flowchart that provides one example of the operation of a portion of the search engine 216 according to various embodiments. It is understood that the flowchart of FIG. 5 provides merely an example of the many different types of functional arrangements that may be employed to implement the operation of the portion of the search engine 216 as described herein. As an alternative, the flowchart of FIG. 5 may be viewed as depicting an example of elements of a method implemented in the computing environment 203 (FIG. 2) according to one or more embodiments.

Beginning with box 503, the search engine 216 receives a request that includes one or more search terms 116 to be included in a potential search query 226. These search terms 116 can include an alternative search term 116, such as an alternative search term 116 identified in the method depicted in FIG. 4, and a list of other potential search terms 116. The In some instances, the request may be received from the network page server 213. In other instances, the request may be received from the client application 239.

Moving to box 506, the search engine 216 determines whether the alternative search term 116 is mutually exclusive with any of the other search terms 116 in the potential search query 226. Two search terms 116 may be mutually exclusive if no search results 119 or entries in a search index 233 would match a search query 226 that includes the two search terms 116. In order to determine whether two search terms 116 are mutually exclusive, the search engine 216 can pursue one or more approaches.

First, the search engine 216 can run a search query 226 that includes two potentially mutually exclusive search terms 116. If no search results 119 are identified, such as entries in the search index 233, then the search engine 216 can conclude that the two search terms 116 are mutually exclusive.

In embodiments where the search engine 216 is browsing a product catalog or similar search index 233, the search engine 216 can instead determine whether the two search terms 116 appear together in any entry in the search index 233. For example, given the search terms "red 4×4 truck," the search engine 216 can parse each entry for a "truck" in the search index 233 to determine whether the search term 116 "red" appears in the same entry as the search term 116 "4×4." If no entry containing both search terms 116 exists, then the search engine 216 can determine that the search terms 116 "red" and "4×4" are mutually exclusive.

Proceeding to box 509, the search engine 216 provides a response identifying the mutually exclusive search terms 116. If the request was originally received from the network page server 213, then the mutually exclusive search terms 116 are provided in a response sent to the network page server 213. Similarly, if the request was instead received from the client application 239, then the mutually exclusive search terms 116 are provided in a response sent to the client application 239.

Figure 6:
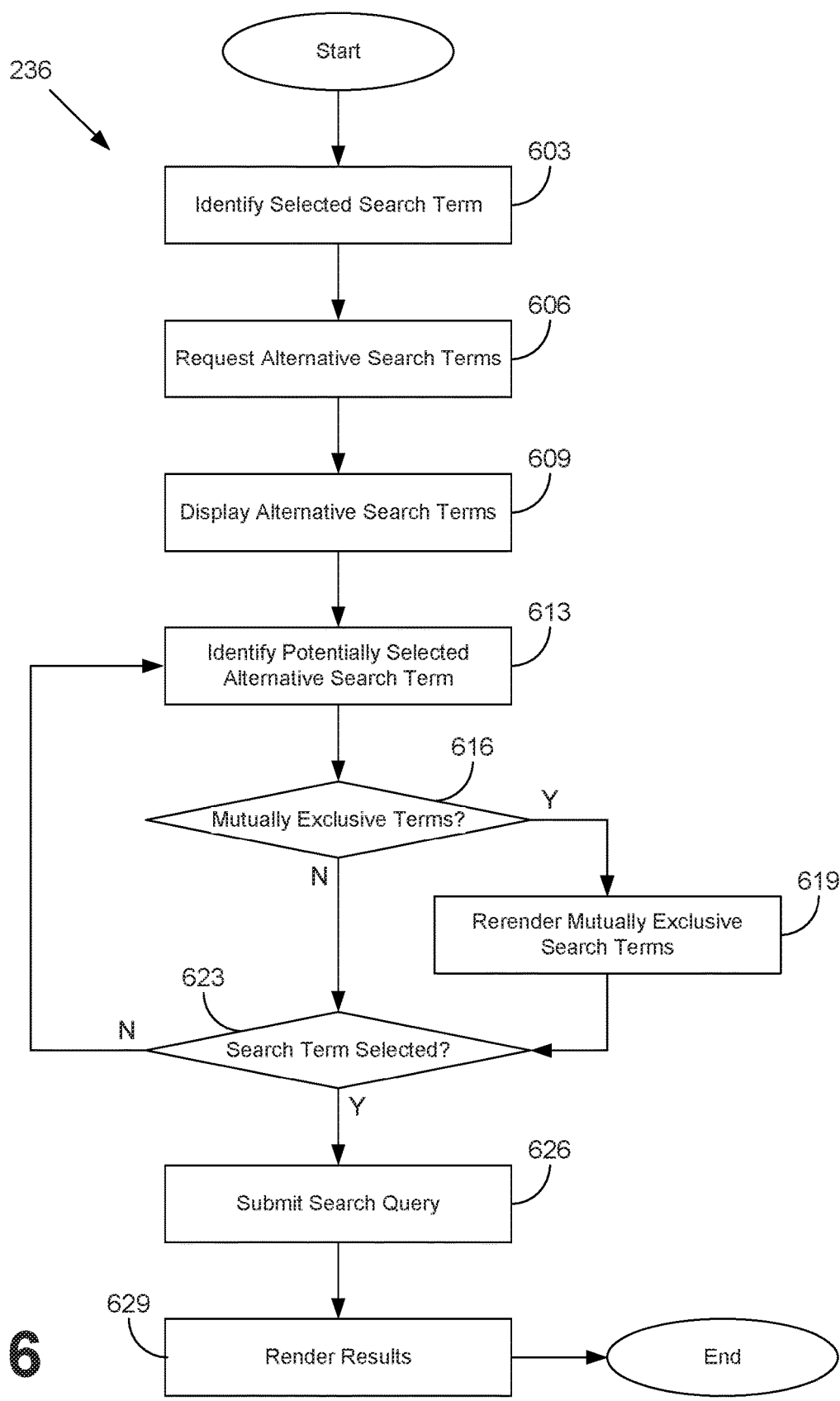
FIG. 6 is a flowchart illustrating one example of functionality implemented as portions of an application executed in the networked environment of FIG. 2 according to various embodiments of the present disclosure.

Referring next to FIG. 6, shown is a flowchart that provides one example of the operation of a portion of the script 236 according to various embodiments. It is understood that the flowchart of FIG. 6 provides merely an example of the many different types of functional arrangements that may be employed to implement the operation of the portion of the script 236 as described herein. As an alternative, the flowchart of FIG. 6 may be viewed as depicting an example of elements of a method implemented in the computing environment 203 (FIG. 2) according to one or more embodiments.

Beginning with box 603, the script 236 identifies a search term 116 selected by a user. This can be accomplished through several approaches. For example, each search term 116 displayed on a network page 103 (FIG. 2) may have a corresponding snippet of executable code (e.g., JAVASCRIPT®, VBSCRIPT®, or a similar scripting language) associated with it. This code can execute whenever a user selects the search term 116 (e.g., when a mouse click occurs), thereby identifying the search term 116 as being selected.

Proceeding to box 606, the script 236 can request a list of alternatives to the selected search term 116. The request can include the identity of the search term 116 selected and can also include other search terms 116, such as additional search terms 116 in a previously submitted search query 226 or additional terms included in the title of the network page 103. In some instances, the request can be sent to the network page server 213. In other instances, the request can be sent to the search engine 216.

Moving on to box 609, the script 236 displays a list of alternatives to the selected search term 116. Accordingly, the script 236 causes the client application 239 to render a user interface element on the display of the client device 206 containing a list of alternatives to the selected search term 116. In some instances, the user interface element can be rendered as an overlay of the network page 103. In other instances, the script 236 could cause a new window (e.g., a pop-up window) to open that contains the list of alternatives to the selected search term 116. The user is then able to select a term 116 from the list of alternative terms 109b presented. As an example, the script 236 could display a list of alternative search terms 116 in a manner depicted in FIG. 1B. As another example, the script 236 could display a list of alternative search terms 116 in a manner depicted in FIG. 1E.

Referring next to box 613, the script 236 can identify a potentially selected term from the list of alternative search terms displayed. For example, if a user's mouse is positioned over a search term 116, but has not clicked on the search term 116, then the script 236 can identify the search term 116 as being potentially selected. In some instances, a threshold time value may be used to further refine the identification. For example, the script 236 may only identify a search term 116 as being potentially selected if a mouse cursor has hovered over the search term 116 for at least a half-second, one second, etc.

Proceeding to box 616, the script 236 determines whether the potentially selected search term 116 is mutually exclusive with any of the other search terms 116. For example, if a user has selected a potential alternative to a term in a title element 106b (FIG. 1B), then the script 236 may determine whether any of the other terms in the title element 106b are mutually exclusive with the potential alternative. Likewise if the user has selected a potential alternative to a search term 116 in a previously submitted search query 226 (FIG. 1E), then the script 236 may determine whether any of the other search terms 116 in the search query 226 are mutually exclusive with the potential alternative. To make this determination, the script 236 can include the alternative term and other search terms 116 in a request to the search engine 216. The script 236 can then wait until a reply is received from the search engine 216 indicating whether any of the search terms 116 are mutually exclusive with the alternative term 116. If a mutually exclusive search term 116 is identified, then execution proceeds to box 619. If no mutually exclusive search terms 116 are identified, then execution skips to box 623.

If execution proceeds to box 619, the script 236 rerenders the search term 116 identified as mutually exclusive in order to provide the user with feedback. For example, the script 236 may remove the mutually exclusive search term 116 from the network page 103. As another example, the script 236 may change the color of the search term 116 to indicate that it is mutually exclusive with the potential alternative term 116.

When execution proceeds to box 623, the script 236 determines whether the potential alternative term 116 is selected by the user. For example, the script 236 could detect that the user has clicked on the potential alternative term 116 with his or her mouse cursor. Likewise, the script 236 could determine that a user has pressed on a touchscreen display in the region where the potential alternative term 116 is being rendered. Other approaches may also be used for various implementations. If potential alternative term 116 is not selected, then execution proceeds back to box 613. For example, if a user moved their mouse cursor to another term 116, then execution could proceed to box 613. However, if the user selected the potential alternative term 116, then execution proceeds to box 626.

Referring next to box 626, the script 236 submits a new search query containing the alternative term. The new search query 226 can also include other terms, such as other search terms 116 included in a previously submitted search query 226 or other terms in a title element 106b of a network page. In some embodiments, the search query 226 may be submitted to the network page server 213 for processing. In other embodiments, the search query 226 may be submitted directly to the search engine 216.

Moving on to box 629, the script 239 renders the results of the search query 226 submitted in box 626. For example, the script 239 may replace the previously displayed search results 119 with the new search results 119. Execution of the script subsequently ends.

Figure 7:
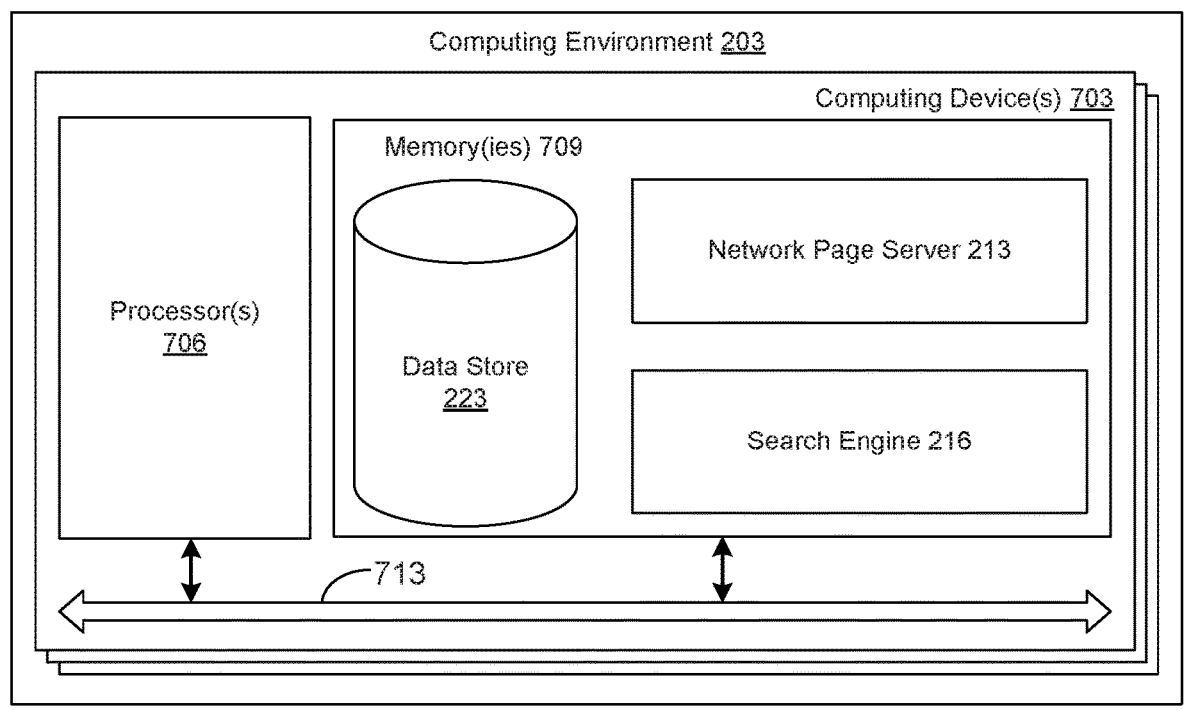
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 703. Each computing device 703 includes at least one processor circuit, for example, having a processor 706 and a memory 709, both of which are coupled to a local interface 713. To this end, each computing device 703 may include, for example, at least one server computer or like device. The local interface 713 may include, for example, a data bus with an accompanying address/control bus or other bus structure as can be appreciated.

Stored in the memory 709 are both data and several components that are executable by the processor 706. In particular, stored in the memory 709 and executable by the processor 706 are the network page server 213, the search engine 216, or potentially other applications. Also stored in the memory 709 may be a data store 223 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

Also, the processor 706 may represent multiple processors 706 or multiple processor cores and the memory 709 may represent multiple memories 709 that operate in parallel processing circuits, respectively. In such a case, the local interface 713 may be an appropriate network that facilitates communication between any two of the multiple processors 706, between any processor 706 and any of the memories 709, or between any two of the memories 709, etc. The local interface 713 may include additional systems designed to coordinate this communication, including, for example, performing load balancing. The processor 706 may be of electrical or of some other available construction.

Although network page server 213, the search engine 216, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the network page server 213 and the search engine 216. Likewise, the flowchart of FIG. 6 shows the functionality and operation of an implementation of portions of the script 236. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowcharts of FIGS. 3, 4, 5, and 6 show a specific order of execution, it is understood that the order of execution may differ from that which is depicted. For example, the order of execution of two or more blocks may be scrambled relative to the order shown. Also, two or more blocks shown in succession in FIGS. 3, 4, 5, and 6 may be executed concurrently or with partial concurrence. Further, in some embodiments, one or more of the blocks shown in FIGS. 3, 4, 5, and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including network page server 213 and the search engine 216, that includes software or code can be embodied in any non-transitory computer-readable medium for use by or in connection with an instruction execution system such as, for example, a processor 706 in a computer system or other system. In this sense, the logic may include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the network page server 213, the search engine 216, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 703, or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   an application stored in the memory and comprising machine readable instructions that, when executed by the processor, cause the processor to at least:
      generate a network page comprising a user-modifiable title of a particular item presented on the network page;
      embed a script into the network page, wherein the script is configured to:
         in response to a selection of a term in the user-modifiable title from the network page, perform a user-initiated search that identifies availability of an alternative item corresponding to an alternative term,
         render the alternative term in place of the term in the user-modifiable title based at least in part on the user-initiated search identifying the availability of the alternative item corresponding to the alternative term,
         allow the alternative term to be selected as a replacement for the term in the user-modifiable title, and
         send the alternative term to the application;
      send the network page to a client device;
      receive an indication of the alternative term from the script executing on the client device; and
      update the network page to present the alternative item.

2. The system of claim 1, wherein the application further comprises machine readable instructions that, when executed by the processor, cause the processor to at least include in the network page a list of alternative terms for each term in the user-modifiable title.

3. The system of claim 1, wherein the alternative item is provided to the client device via an asynchronous communication function.

4. A method, comprising:
   displaying, via a computing device, a user-modifiable title of a particular item presented on a network page;
   performing, via the computing device, in response to a selection of a term in the user-modifiable title from the network page, a user-initiated search that identifies availability of an alternative item to the particular item;
   identifying, via the computing device, an alternative term based at least in part on the availability of the alternative item;
   rendering, via the computing device, the alternative term in place of the term in the user-modifiable title based at least in part on the user-initiated search identifying the availability of the alternative item corresponding to the alternative term;
   identifying, via the computing device, a selection of the alternative term, wherein the alternative term is displayed in the network page; and
   updating, via the computing device, the network page to present the alternative item that is related to the alternative term.

5. The method of claim 4, wherein the user-modifiable title is a most prominent section of text on the network page.

6. The method of claim 4, wherein the network page comprises the user-modifiable title of the particular item and a search element that is separate from the user-modifiable title.

7. The method of claim 4, further comprising requesting, via the computing device, the alternative term from a remote computing device in response to the selection of the term.

8. The method of claim 4, wherein the term comprises a first term and the method further comprises determining that a second term on the network page is mutually exclusive with the first term.

9. The method of claim 8, further comprising indicating, via the computing device, that the second term on the network page is mutually exclusive with the alternative term in response to the selection of the alternative term.

10. The method of claim 9, wherein indicating that the second term on the network page is mutually exclusive with the alternative term further comprises altering a color of the second term.

11. The method of claim 9, wherein indicating that the second term on the network page is mutually exclusive with the alternative term further comprises removing the second term from the network page.

12. A system, comprising:
   a computing device comprising a processor and a memory; and
   machine readable instructions embedded in a network page stored in the memory that, when executed by the processor, cause the computing device to a least:
      render a term in a user-modifiable title for an item depicted in a user interface of the network page, and in response to a selection of the term in the user-modifiable title, perform a user-initiated search that identifies availability of a plurality of alternative items to the item;
      render an alternative term in place of the term in the user-modifiable title based at least in part on the alternative term being selected as a replacement for the term in the user-modifiable title from a plurality of alternative terms corresponding to the plurality of alternative items identified by the user-initiated search; and update the user interface to depict one of the plurality of alternative items that corresponds to the alternative term that is selected.

13. The system of claim 12, wherein the machine readable instructions embedded in the network page, when executed by the processor, further cause the computing device to at least:

receive the plurality of alternative terms from another computing device, wherein a respective term of the plurality of alternative terms corresponds to a respective item of the plurality of alternative items.

14. The system of claim 13, wherein the machine readable instructions embedded in the network page, when executed by the processor, that cause the computing device to at least receive the plurality of alternative terms from the other computing device further cause the computing device to receive the plurality of alternative terms via an asynchronous communication function.

15. The system of claim 12, wherein the term in the user-modifiable title of the item is a first term in the user-modifiable title of the item, and the machine readable instructions that cause the computing device to render the alternative term for the term in the user-modifiable title of the item depicted in the network page in response to the selection of the term in the user-modifiable title, when executed by the processor, further cause the computing device to at least indicate that the alternative term is mutually exclusive with a second term in the user-modifiable title of the item.

16. The system of claim 15, wherein the machine readable instructions embedded in the network page, when executed by the processor, that cause the computing device to at least indicate that the alternative term is mutually exclusive with the second term in the user-modifiable title of the item further cause the computing device to at least alter a color of the second term.

17. The system of claim 15, wherein the machine readable instructions embedded in the network page, when executed by the processor, that cause the computing device to at least indicate that the alternative term is mutually exclusive with the second term in the user-modifiable title of the item further cause the computing device to at least remove the second term from a rendering of the network page.

18. The system of claim 12, wherein the user-modifiable title of the item is a most prominent section of text on the network page.

19. The system of claim 12, wherein the network page comprises the user-modifiable title of the item and a search element that is separate from the user-modifiable title.

20. The system of claim 12, wherein the alternative term is rendered in the user-modifiable title within a list that includes the term and the alternative term.

* * * * *